(12) United States Patent
Digikar et al.

(10) Patent No.: US 12,184,519 B2
(45) Date of Patent: Dec. 31, 2024

(54) DUAL CHANNEL CORRELATION OF API MONITORING TO BUSINESS TRANSACTIONS

(71) Applicant: Cisco Technology, Inc., San Jose, CA (US)

(72) Inventors: Darshan Deepak Digikar, Belgaum (IN); Mayank Jain, Delhi (IN); Ashish Mishra, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/743,923

(22) Filed: May 13, 2022

(65) Prior Publication Data

US 2023/0370347 A1    Nov. 16, 2023

(51) Int. Cl.
*H04L 43/04* (2022.01)
*H04L 43/0876* (2022.01)

(52) U.S. Cl.
CPC .......... *H04L 43/04* (2013.01); *H04L 43/0876* (2013.01)

(58) Field of Classification Search
CPC .................. H04L 43/04; H04L 43/0876; G06F 2201/865; G06F 2201/875; G06F 11/3466
USPC ......................................................... 709/224
See application file for complete search history.

(56) References Cited

U.S. PATENT DOCUMENTS

| | | |
|---|---|---|
| 7,299,277 B1 | 11/2007 | Moran et al. |
| 8,745,214 B2 | 6/2014 | Inamdar et al. |
| 9,652,357 B2 | 5/2017 | Gupta et al. |
| 10,671,507 B2 | 6/2020 | Prabath et al. |
| 10,901,880 B1 * | 1/2021 | Bernard .............. G06F 11/3476 |

(Continued)

OTHER PUBLICATIONS

Jones, et al., "JSON Web Token (JWT)", Internet Engineering Task Force, Request for Comments 7519, May 2015, 30 pages, IETF Trust.

(Continued)

*Primary Examiner* — Tan Doan
(74) *Attorney, Agent, or Firm* — BEHMKE INNOVATION GROUP LLC; James M. Behmke; James J. Wong (57) ABSTRACT

In one embodiment, an illustrative method herein may comprise: sending, from a server instrumentation agent configured on a transaction server, instrumented server performance data regarding the transaction server and an associated correlation token to an application programming interface (API) monitoring agent; receiving, at the server instrumentation agent, a returned acknowledgment of the instrumented server performance data regarding the transaction server and the associated correlation token from the API monitoring agent, the acknowledgement also having corresponding API monitored performance data regarding an API of the transaction server; returning, from the server instrumentation agent, a synchronization acknowledgment to the API monitoring agent in response to the returned acknowledgment to indicate complete synchronization; and correlating, by the server instrumentation agent, the instrumented server performance data regarding the transaction server and the API monitored performance data regarding the API of the transaction server based on the associated correlation token and complete synchronization.

17 Claims, 8 Drawing Sheets

(56) References Cited

U.S. PATENT DOCUMENTS

| | | |
|---|---|---|
| 11,256,590 B1 | 2/2022 | Hulick, Jr. |
| 2004/0220947 A1* | 11/2004 | Aman ................. G06F 11/3433 |
| 2016/0337511 A1* | 11/2016 | Purkayastha ....... H04M 3/5175 |

OTHER PUBLICATIONS

"JSON Web Tokens", online: https://jwt.io/, accessed May 13, 2022, 5 pages.

"How does transaction correlation work in the Java environment?", online: https://community.appdynamics.com/t5/Knowledge-Base/How-does-tran . . . , accessed May 13, 2022, 4 pages, AppDynamics.

John, et al., "Improved Observability in Distribution Grids Using Correlational Measurements", IEEE Access, vol. 10, Mar. 2, 2022, pp. 27320-27329, IEEE.

"Synthetic Monitoring", online: https://www.appdynamics.com/product/end-user-monitoring/synthetic-monitoring, accessed May 13, 2022, 2 pages, AppDynamics.

"Winter 2022—Synthetic API Monitoring", online: https://www.appdynamics.com/product-updates, accessed May 13, 2022, 18 pages, AppDynamics.

"Multistep API Tests", online: https://docs.datadoghq.com/synthetics/multistep/?tab=requestoptions, accessed May 13, 2022, 7 pages, DataDog.

\* cited by examiner

DUAL CHANNEL CORRELATION OF API MONITORING TO BUSINESS TRANSACTIONS

TECHNICAL FIELD

The present disclosure relates generally to computer systems, and, more particularly, to dual channel correlation of application programming interface (API) monitoring to business transactions.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, while there are existing technologies that perform synthetic application programming interface (API) monitoring, and there are existing technologies that perform business transaction instrumentation and analysis, there is no coordination between the two. Failures in API monitoring do not indicate where exactly the issue lies and how they correlate with the business transaction. The root cause analysis (RCA) isn't clear. Similarly, the blast radius for the failing APIs cannot be ascertained from a degradation in performance reported by instrumentation agents on the server side of a business transaction.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an illustrative method herein may comprise: sending, from a server instrumentation agent configured on a transaction server, instrumented server performance data regarding the transaction server and an associated correlation token to an application programming interface (API) monitoring agent; receiving, at the server instrumentation agent, a returned acknowledgment of the instrumented server performance data regarding the transaction server and the associated correlation token from the API monitoring agent, the acknowledgement also having corresponding API monitored performance data regarding an API of the transaction server; returning, from the server instrumentation agent, a synchronization acknowledgment to the API monitoring agent in response to the returned acknowledgment to indicate complete synchronization; and correlating, by the server instrumentation agent, the instrumented server performance data regarding the transaction server and the API monitored performance data regarding the API of the transaction server based on the associated correlation token and complete synchronization.

According to one or more embodiments of the disclosure, another illustrative method herein may comprise: receiving, at an API monitoring agent from a server instrumentation agent configured on a transaction server, instrumented server performance data regarding the transaction server and an associated correlation token; sending, from the API monitoring agent to the server instrumentation agent, a returned acknowledgment of the instrumented server performance data regarding the transaction server and the associated correlation token, the acknowledgement also having corresponding API monitored performance data regarding an API of the transaction server; receiving, at the API monitoring agent from the server instrumentation agent, a synchronization acknowledgment in response to the returned acknowledgment to indicate complete synchronization; and correlating, by the API monitoring agent, the instrumented server performance data regarding the transaction server and the API monitored performance data regarding the API of the transaction server based on the associated correlation token and complete synchronization.

According to one or more embodiments of the disclosure, an illustrative system herein may comprise: a transaction server; a server instrumentation agent configured on the transaction server; and an API monitoring agent; wherein the server instrumentation agent is configured to send instrumented server performance data regarding the transaction server and an associated correlation token to the API monitoring agent; wherein the API monitoring agent is configured to send, to the server instrumentation agent, a returned acknowledgment of the instrumented server performance data regarding the transaction server and the associated correlation token, the acknowledgement also having corresponding API monitored performance data regarding an API of the transaction server; wherein the server instrumentation agent is further configured to return a synchronization acknowledgment to the API monitoring agent in response to the returned acknowledgment to indicate complete synchronization; and wherein one or both of the server instrumentation agent or the API monitoring agent are configured to correlate the instrumented server performance data regarding the transaction server and the API monitored performance data regarding the API of the transaction server based on the associated correlation token and complete synchronization.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
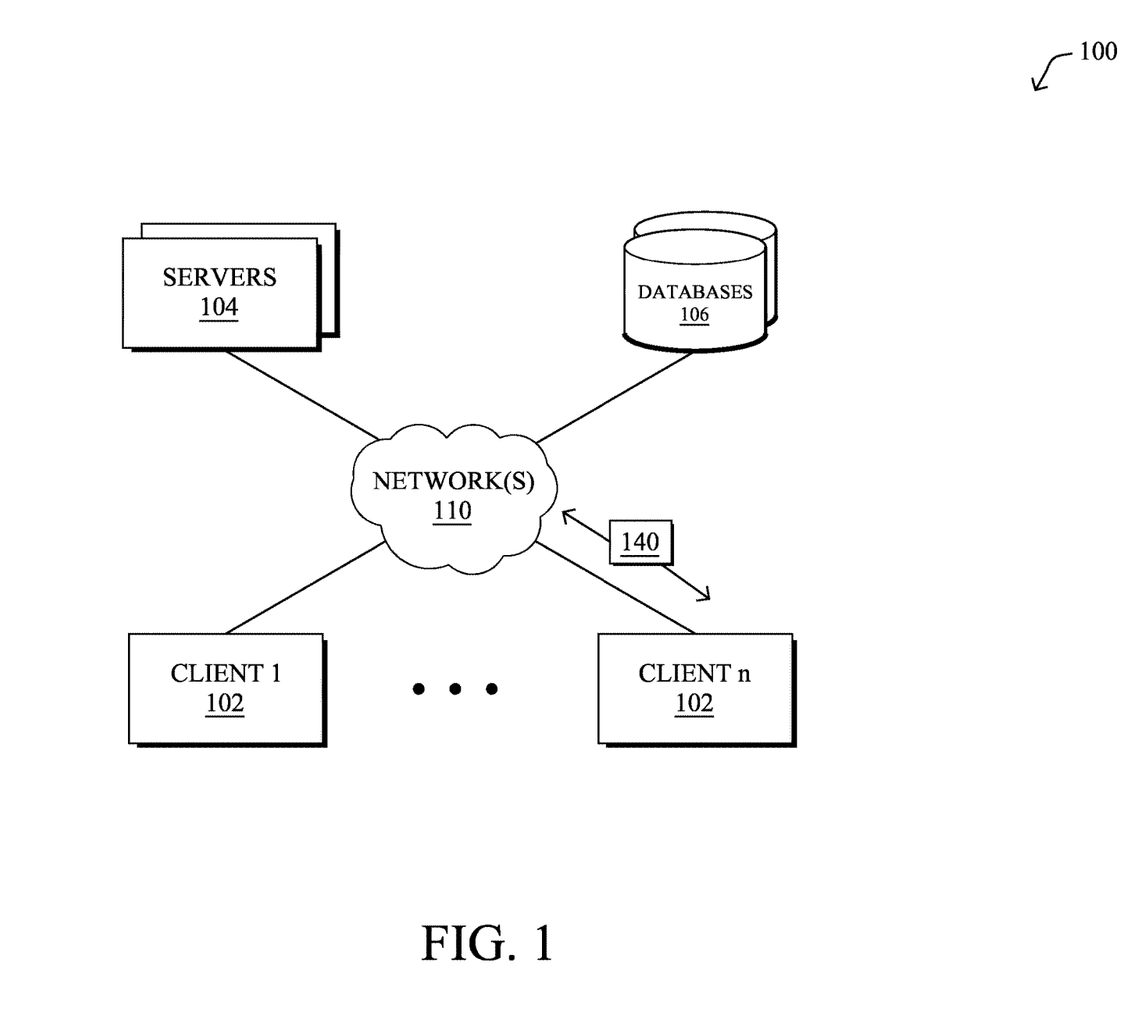
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
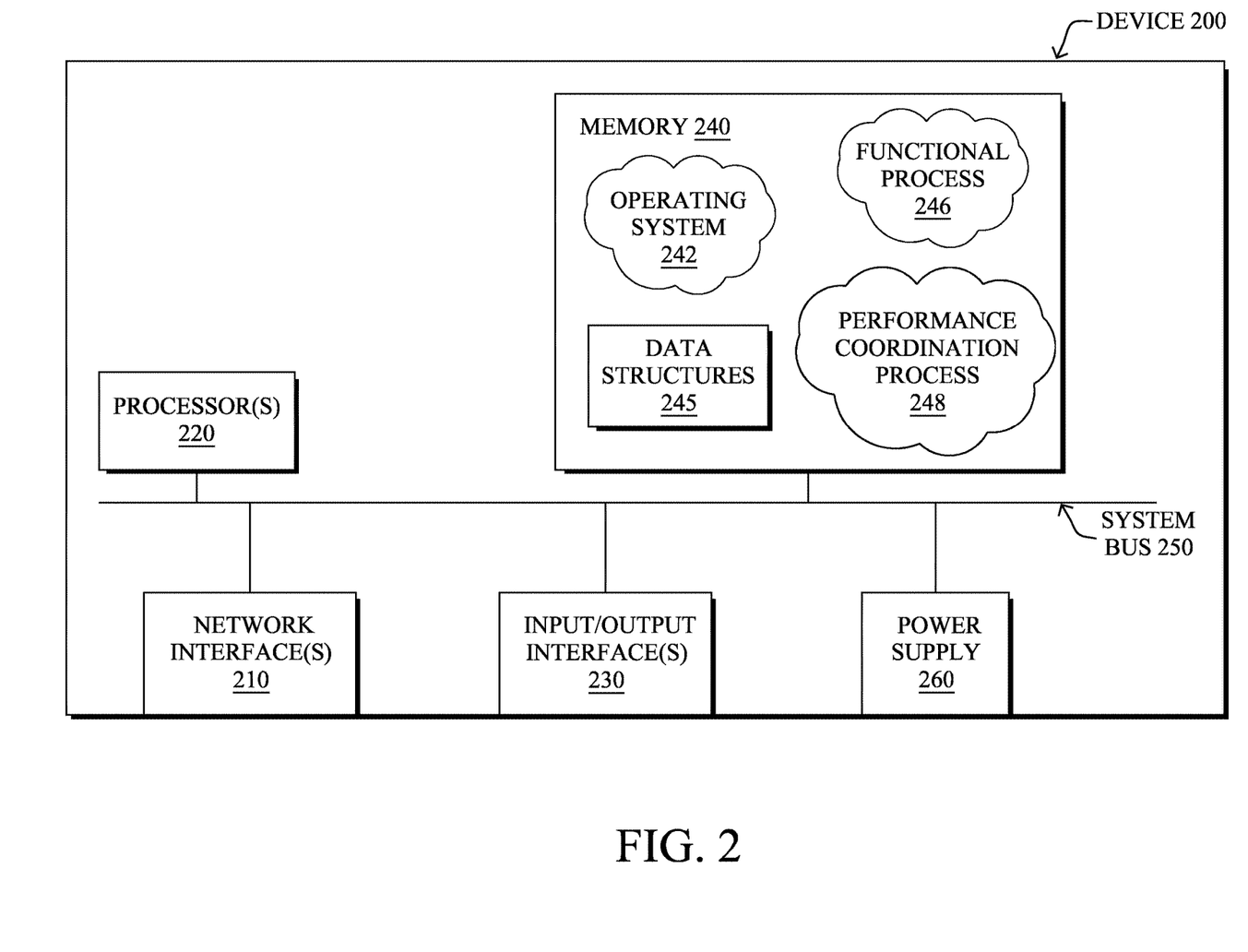
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "performance coordination" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, is such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
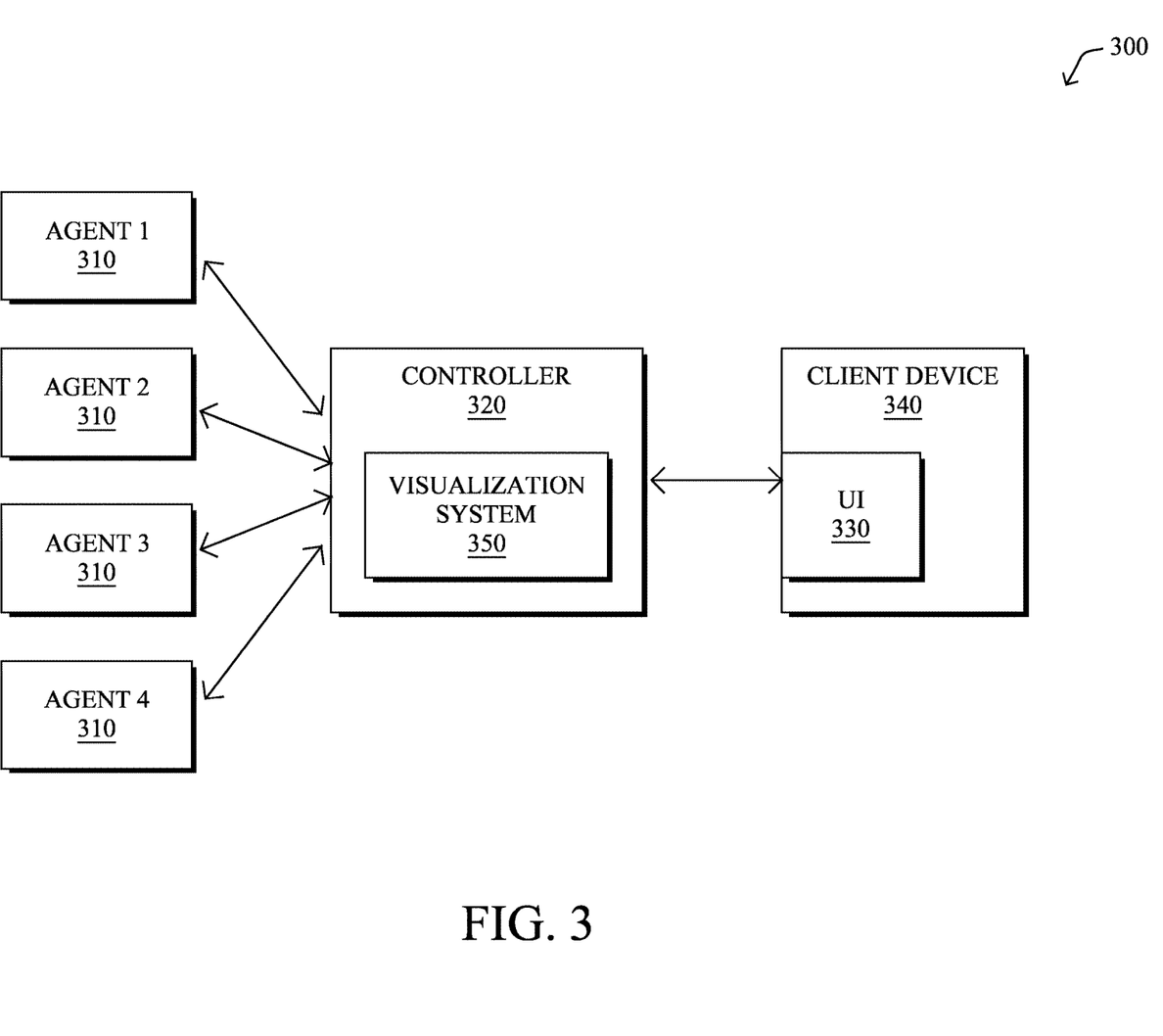
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, an instance of controller 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Correlation of API Monitoring to Business Transactions—

As noted above, there are existing technologies that perform synthetic application programming interface (API) monitoring, and there are existing technologies that perform business transaction instrumentation and analysis, however, there is no coordination between the two. For instance, as also noted above, failures in API monitoring do not indicate where exactly the issue lies and how they correlate with the business transaction, and the root cause analysis (RCA) isn't clear. Similarly, the blast radius for the failing APIs cannot be ascertained from a degradation in performance is reported by instrumentation agents on the server side of a business transaction.

Notably, synthetic API monitoring helps developers and maintainers know proactively about the status of their API end points. It shows an abstract of whether the API is giving the desired outcome or not. However, at time of deviation from the desired outcome, it gives the user no idea about what malfunctioned in the service backend. BT (business transaction) analysis can show the health of a service backend and other services it is dependent on, but it does not tell the impact of that health on the actual outcome that is the API endpoint.

The techniques herein, therefore, dual channel correlation of API monitoring to business transactions, where a two-way communication is established between API synthetic monitoring (service generically) and application performance monitoring (APM) agents to provide synchronized correlation data, e.g., merging the two sides of the observability intelligence platform above. In this manner, a dual channel approach is provided to correlate API monitoring metrics aggregated from synthetic agents with business transaction data through APM agents.

As described below, the techniques herein correlate both API monitoring baselining data and business transaction metrics, such that users can monitor the API endpoints and can directly see which business transaction that endpoint is dependent on. This reduces the need for the user to have a high domain knowledge and context regarding the services. Also, at times of failure the user can easily find the root cause of any deterioration in the API endpoint health. The techniques herein also help the users find the blast radius of any failure in the backend. In particular, as detailed below, the techniques herein provide a "one click" solution that takes the user from their API monitoring session (a single call on the API) to its corresponding Business Transaction. Moreover, the user can be shown data related to the BT for the exact time when the session occurred, so as to identify any intermittent issue(s).

Figure 4:
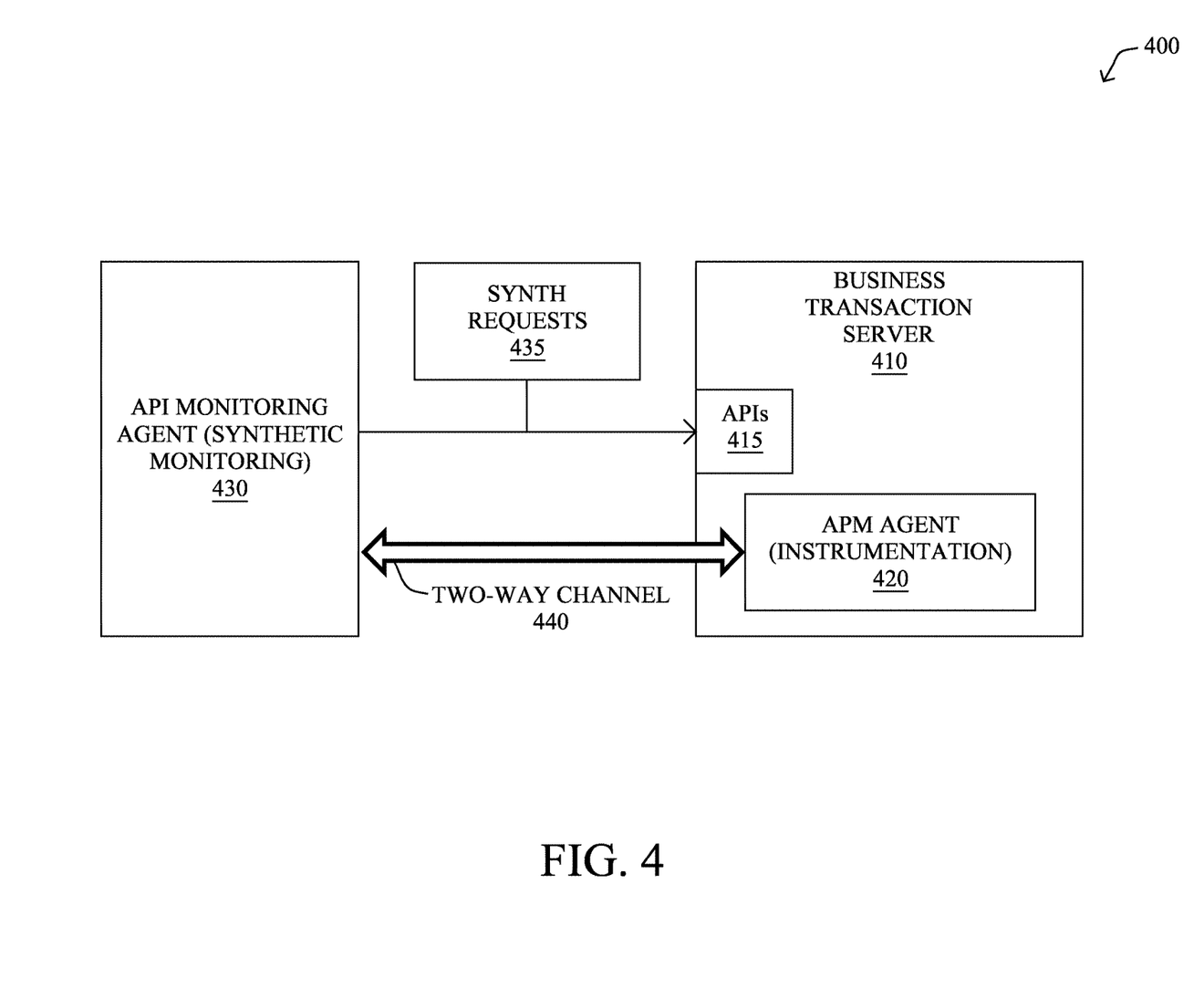
FIG. 4 illustrates an example of application programming interface (API) monitoring and business transaction instrumenting.

Operationally, and with reference to the simplified network environment 400 of FIG. 4, to achieve these results, the techniques herein begin with a business transaction server 410 that is handling a business transaction (e.g., one of a plurality of servers handling a particular type of business transaction), and embedding (or configuring) a server instrumentation agent 420 (e.g., a java agent) on the server, such as placing or enabling various APM agents on the server, for instrumentation-based monitoring, accordingly. API monitoring (e.g., synthetic monitoring), on the other hand, is done using one or more API monitoring agents 430 that "hit" (ping, send messages to, send requests to, etc.) the APIs 415 of the server 410 periodically with a synthetic message 435, thus providing data related to the API and its performance. In one embodiment, the techniques herein may use short-lived managed container-based management pods (e.g., Kubernetes pods) as API monitoring agents that can hit the API with a high frequency. According to the embodiments herein, a two-way channel 440 is opened between the APM/instrumentation agents 420 and API monitoring agent 430 whenever this API call is made. The two-way channel 440 works like a three-way handshake.

Figure 5:
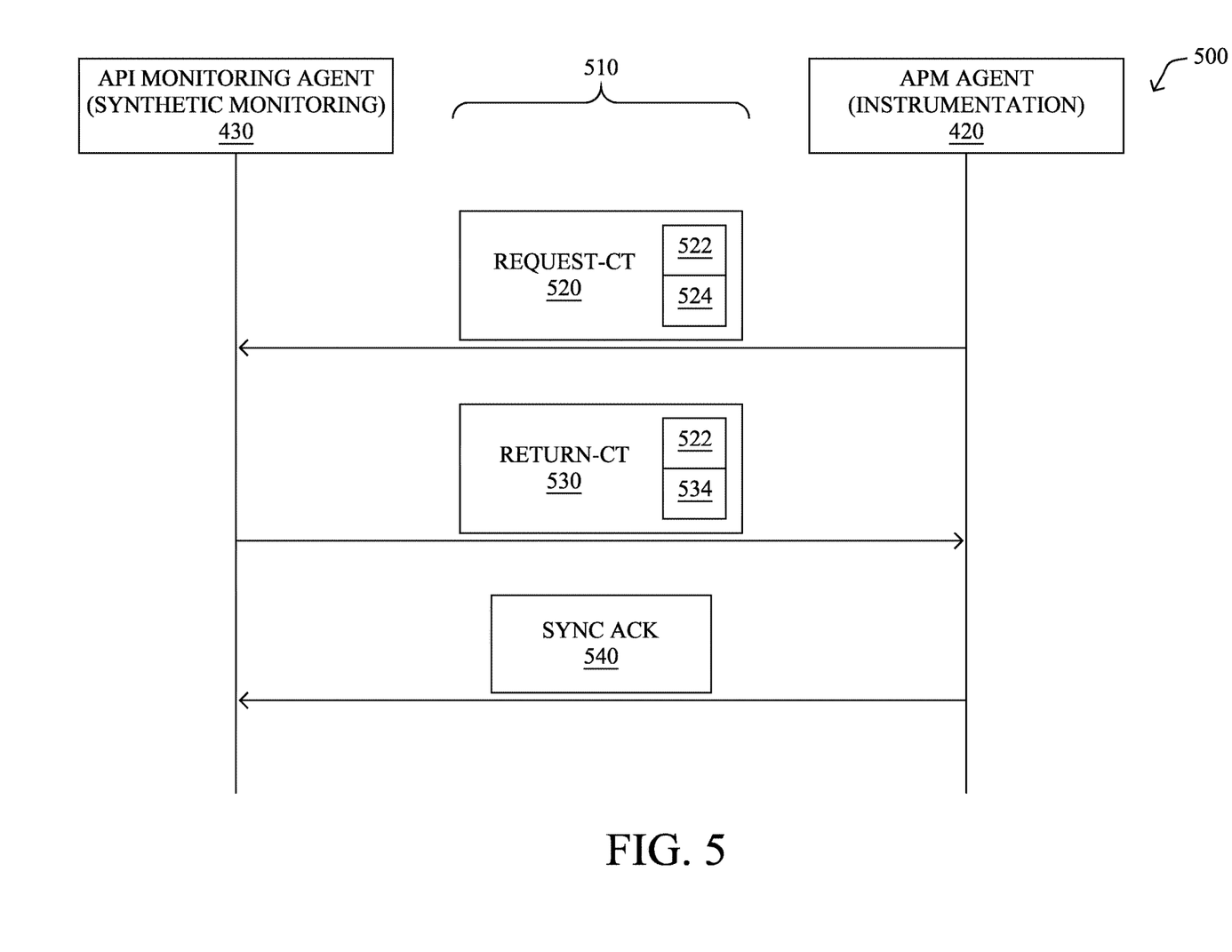
FIG. 5 illustrates an example of dual channel correlation of API monitoring to business transactions.

In particular, FIG. 5 illustrates a simplified example of a three-way handshake 500 over the two-way channel according to the techniques herein. Using an encoding mechanism (e.g., JSON web tokens, or "JWTs"), the dual channel messages 510 between the APM agent 420 and the API monitoring agent 430 provide metadata of the involved identifiers, referred to herein as a "Correlation Token" (CT). The handlers packaged as part of the library used at each end of the communication ensure proper encoding and decoding of the messages.

Specifically, the APM agents 420 will send a "Req-CT" (Request-CT) message 520 periodically with a request token 522 and associated performance metrics 524. The service receiving it (API monitoring agent 430) will send a "Ret-CT" (Return-CT) message 530 acknowledging the sent data (metrics 524) from the APM agents 420 and to return the corresponding data (performance metrics 534) from its side to the agent. This will ensure the reverse correlation data (e.g., for determining a "blast radius") is also available to the APM agent (and associated APM observability platform, i.e., the "APM side" of the coordination). Furthermore, the APM agent will then send a Syn-CT (Synchronization message) 540 to the service (API monitoring agent in this case) to ensure that synchronization is complete. This will ensure that the correlation data is updated and latest. Not that the handlers at each side are responsible for retries incase data is not received.

Figure 6:
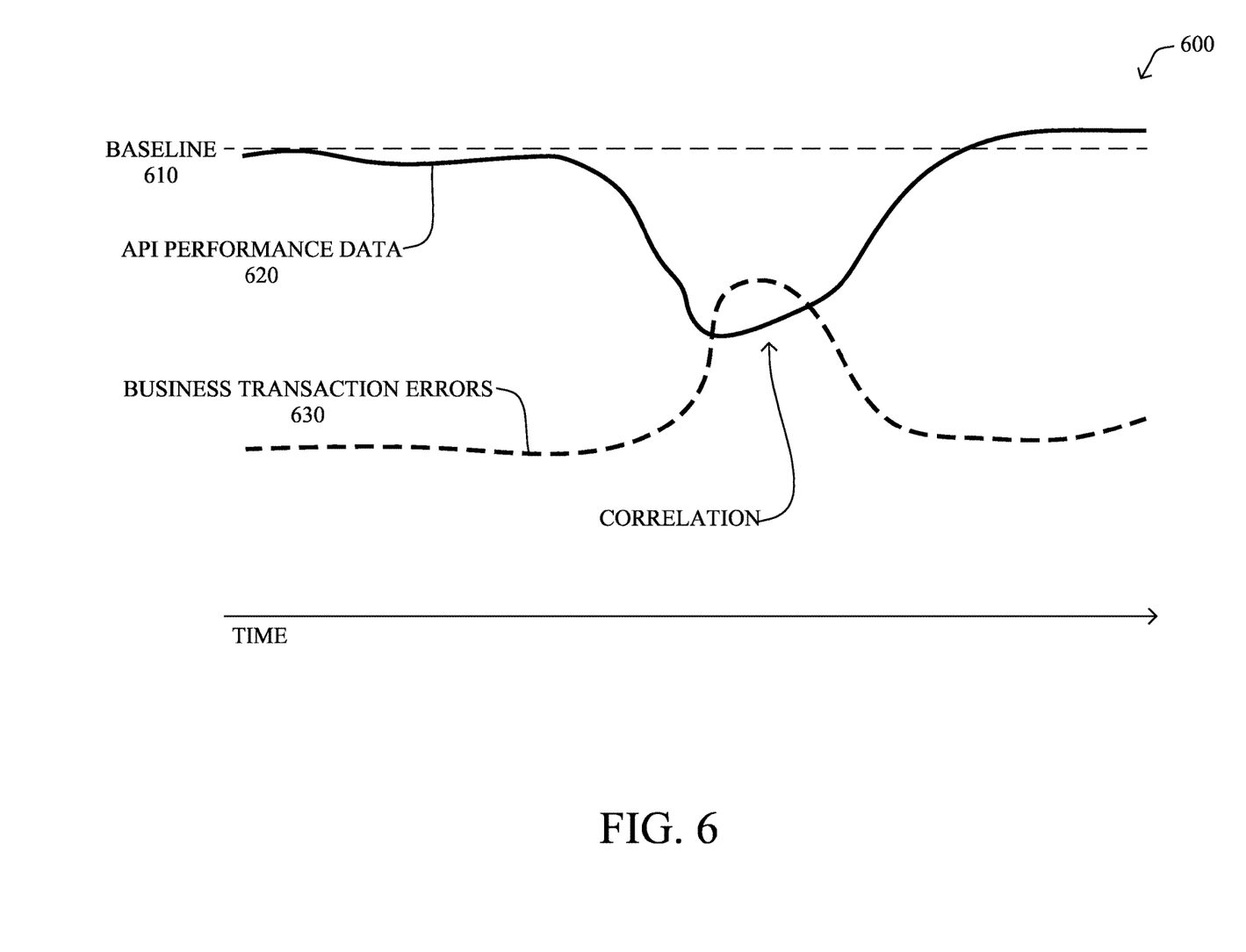
FIG. 6 illustrates another example of dual channel correlation of API monitoring to business transactions.

FIG. 6 illustrates an example visualization 600 of a specific use-case (that is not meant to be limiting to the scope of the techniques herein). In particular, the API monitoring agent can create baseline metrics 610 based on the periodically collected data. When a failure happens, the data from the APM agent and API monitoring agent can then be correlated using the correlation tokens (CT 640) and the associated available data being sent by each side (API performance data 620 and APM performance data 630). Alternatively, for any backend health deterioration, the business transaction service (APM agents) can collect data from the API monitoring services related to all the corresponding traces. This data provides metrics corresponding to the correlated deviations from baseline data of latency, availability, etc. This approach helps in ascertaining a blast radius of any anomaly on the server side being monitored by the APM agent. The three-way handshake mechanism ensures there is no out-of-sync data. (Note that a traditional way of sending data through only stateless API calls will not guarantee proper correlation on both the sides.)

Figure 7:
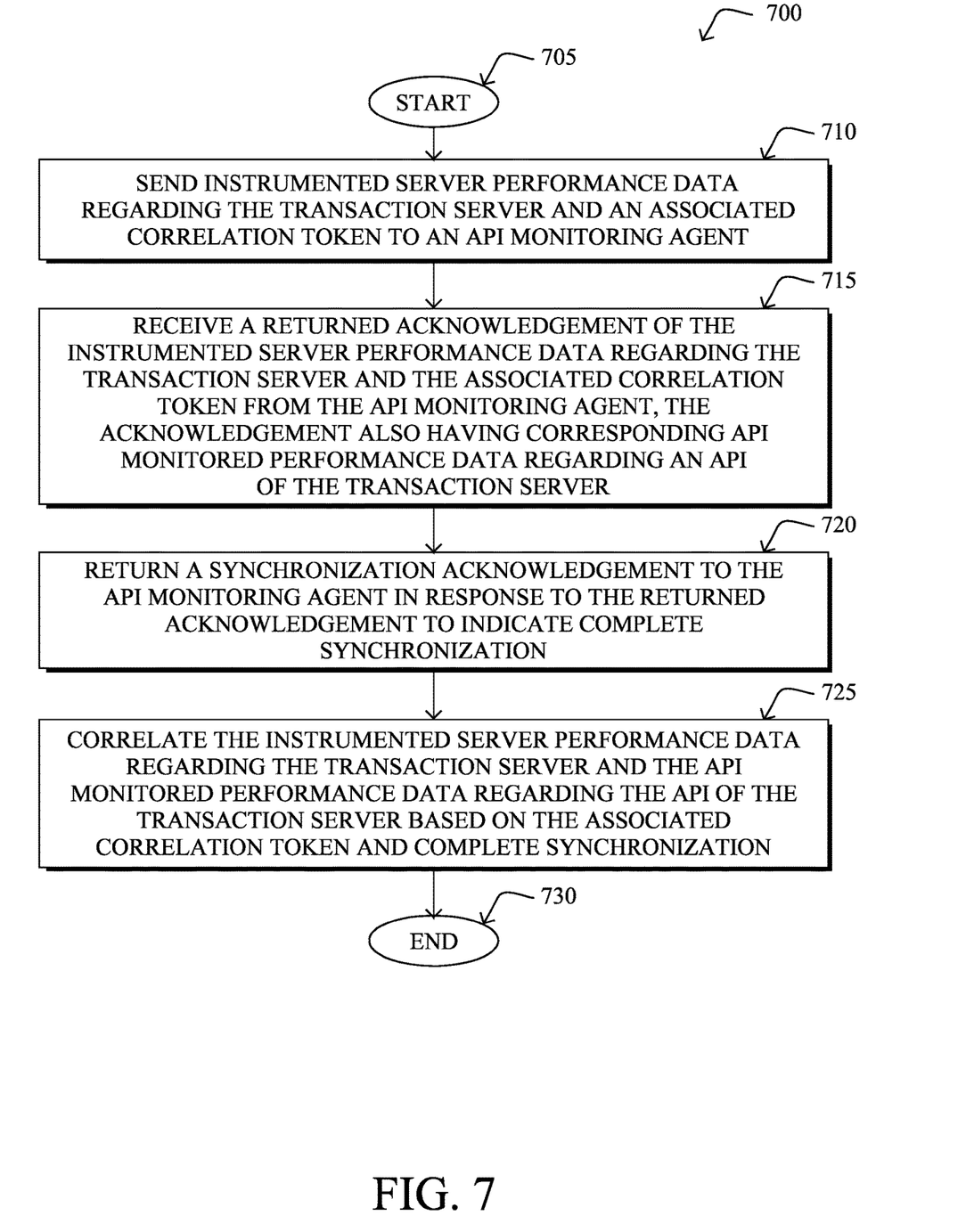
FIG. 7 illustrates an example simplified procedure for dual channel correlation of API monitoring to business transactions in accordance with one or more embodiments described herein, particularly from the perspective of a server instrumentation agent configured on a transaction server.

In closing, FIG. 7 illustrates an example simplified procedure for dual channel correlation of API monitoring to business transactions in accordance with one or more embodiments described herein, particularly from the perspective of a server instrumentation agent configured on a transaction server (e.g., an APM java agent). For example, a non-generic, specifically configured device (e.g., device 200) may perform procedure 700 by executing stored instructions (e.g., process 248). The procedure 700 may start at step 705, and continues to step 710, where, as described in greater detail above, the server instrumentation agent sends instrumented server performance data regarding the transaction server (e.g., corresponding to completion (or attempted completion) of an online business transaction) and an associated correlation token to an API monitoring agent. In step 715, the server instrumentation agent then receives a returned acknowledgment of the instrumented server performance data regarding the transaction server and the associated correlation token from the API monitoring agent, the acknowledgement also having corresponding API monitored performance data regarding an API of the transaction server (e.g., associated with a baseline of performance). As such, in step 720, the server instrumentation agent may then return a synchronization acknowledgment to the API monitoring agent in response to the returned acknowledgment to indicate complete synchronization. In step 725, the server instrumentation agent may then correlate the instrumented server performance data regarding the transaction server and the API monitored performance data regarding the API of the transaction server based on the associated correlation token and complete synchronization. In one embodiment, correlating occurs in response to a trigger (e.g., a failure, an anomaly, a visualization request, an audit, etc.).

The simplified procedure 700 may then end in step 730, notably with the ability to continue sending, receiving, and correlating data. Other steps may also be included generally within procedure 700. For example, such steps (or, more generally, such additions to steps already specifically illustrated above), may include: determining a plurality of online business transactions affected by correlated API monitored performance data regarding the API of the transaction server; computing/instrumenting the instrumented server performance data regarding the transaction server; and so on.

Figure 8:
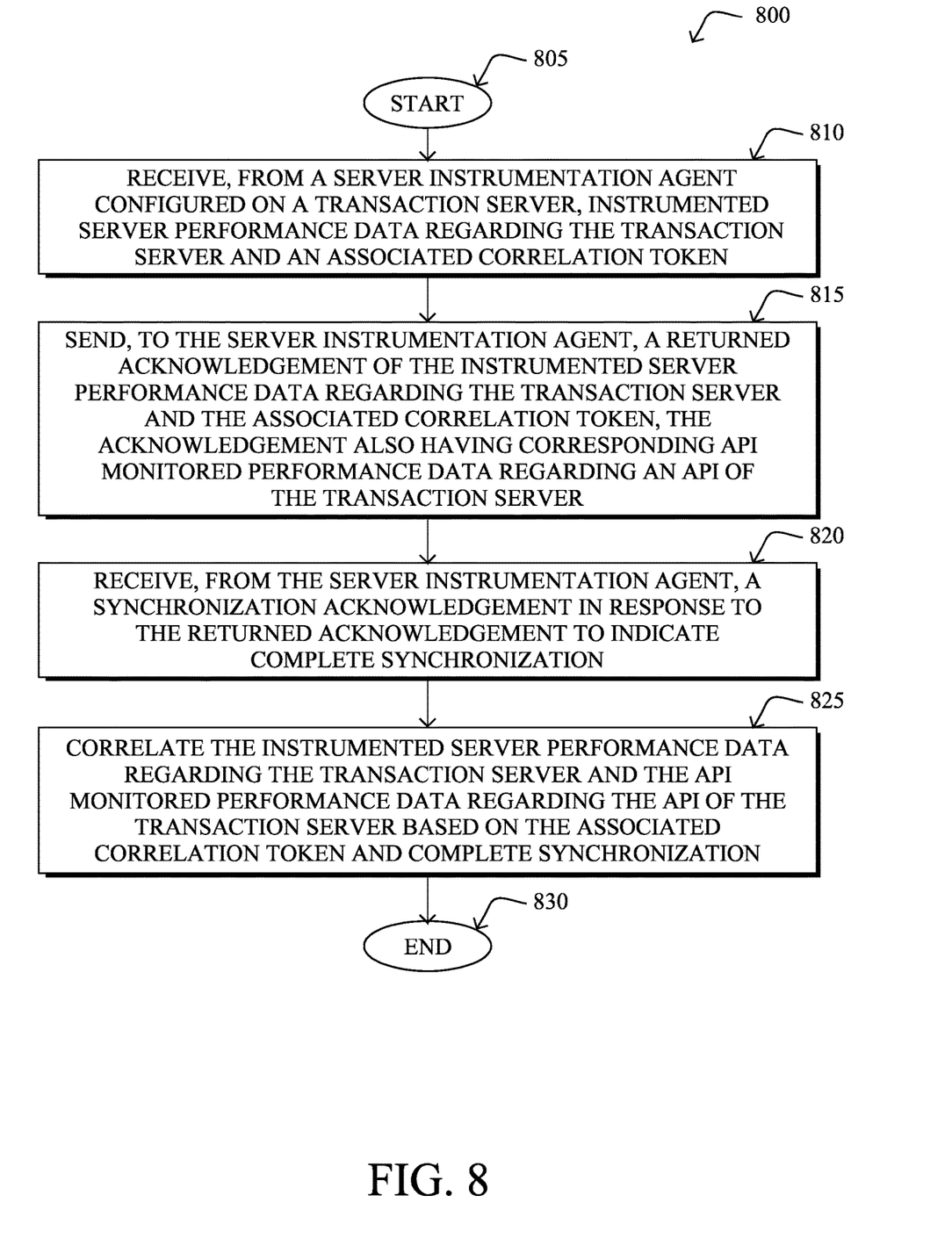
FIG. 8 illustrates an example simplified procedure for dual channel correlation of API monitoring to business transactions in accordance with one or more embodiments described herein, particularly from the perspective of an API monitoring agent.

In addition, FIG. 8 illustrates an example simplified procedure for dual channel correlation of API monitoring to business transactions in accordance with one or more embodiments described herein, particularly from the perspective of an API monitoring agent (e.g., in one embodiment, a container-based management pod or Kubernetes pod). For example, a non-generic, specifically configured device (e.g., device 200) may perform procedure 800 by executing stored instructions (e.g., process 248). The procedure 800 may start at step 805, and continues to step 810, where, as described in greater detail above, the API monitoring agent receives, from a server instrumentation agent configured on a transaction server, instrumented server performance data regarding the transaction server and an associated correlation token. In step 815, the API monitoring agent sends, to the server instrumentation agent, a returned acknowledgment of the instrumented server performance data regarding the transaction server and the associated correlation token, the acknowledgement also having corresponding API monitored performance data regarding an API of the transaction server. Then in step 820, API monitoring agent receives, from the server instrumentation agent, a synchronization acknowledgment in response to the returned acknowledgment to indicate complete synchronization. Lastly, in step 825, API monitoring agent can correlate the instrumented server performance data regarding the transaction server and the API monitored performance data regarding the API of the transaction server based on the associated correlation token and complete synchronization.

The simplified procedure 800 may then end in step 830, notably with the ability to continue sending, receiving, and correlating data. Other steps may also be included generally within procedure 800. For example, such steps (or, more generally, such additions to steps already specifically illustrated above), may include generating the shared data, such as, e.g., sending, from the API monitoring agent, synthetic API calls to the API of the transaction server, and computing, by the API monitoring agent; the corresponding API monitored performance data regarding the API of the transaction server based on responsiveness to the synthetic API calls by the API of the transaction server.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for dual channel correlation of API monitoring to business transactions. In particular, the techniques herein may be applied to agent-based performance observability, Open Telemetry based metric collection, and other types of location agnostic networks where two different performance monitoring systems overlap coverage without having specific correlation otherwise between the two monitoring systems.

In still further embodiments of the techniques herein, a business impact of the correlated data can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the correlated data with various specific business transactions in order to better understand the effect on the business transactions, accordingly.

Illustratively, the techniques described herein may be performed by hardware, software, and/or firmware, such as in accordance with the illustrative performance coordination process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: sending, from a server instrumentation agent configured on a transaction server, instrumented server performance data regarding the transaction server and an associated correlation token to an application programming interface monitoring agent; receiving, at the server instrumentation agent, a returned acknowledgment of the instrumented server performance data regarding the transaction server and the associated correlation token from the application programming interface monitoring agent, the acknowledgement also having corresponding application programming interface monitored performance data regarding an application programming interface of the transaction server; returning, from the server instrumentation agent, a synchronization acknowledgment to the application programming interface monitoring agent in response to the returned acknowledgment to indicate complete synchronization; and correlating, by the server instrumentation agent, the instrumented server performance data regarding the transaction server and the application programming interface monitored performance data regarding the application programming interface of the transaction server based on the associated correlation token and complete synchronization.

In one embodiment, correlating occurs in response to a trigger. In one embodiment, the trigger is selected from a group consisting of: a failure; an anomaly; a visualization request; and an audit.

In one embodiment, the corresponding application programming interface monitored performance data regarding the application programming interface of the transaction server is associated with a baseline of performance.

In one embodiment, the instrumented server performance data regarding the transaction server corresponds to completion of an online business transaction. In one embodiment, the method further comprises: determining a plurality of online business transactions affected by correlated application programming interface monitored performance data regarding the application programming interface of the transaction server.

In one embodiment, the server instrumentation agent comprises an application performance measurement java agent.

According to the embodiments herein, another illustrative method herein may comprise: receiving, at an application programming interface monitoring agent from a server instrumentation agent configured on a transaction server, instrumented server performance data regarding the transaction server and an associated correlation token; sending, from the application programming interface monitoring agent to the server instrumentation agent, a returned acknowledgment of the instrumented server performance data regarding the transaction server and the associated correlation token, the acknowledgement also having corresponding application programming interface monitored performance data regarding an application programming interface of the transaction server; receiving, at the application programming interface monitoring agent from the server instrumentation agent, a synchronization acknowledgment in response to the returned acknowledgment to indicate complete synchronization; and correlating, by the application programming interface monitoring agent, the instrumented server performance data regarding the transaction server and the application programming interface monitored performance data regarding the application programming interface of the transaction server based on the associated correlation token and complete synchronization.

In one embodiment, this method may further comprise: sending, from the application programming interface monitoring agent, at least one synthetic application programming interface call to the application programming interface of the transaction server; and computing, by the application programming interface monitoring agent; the corresponding application programming interface monitored performance data regarding the application programming interface of the transaction server based on responsiveness to the at least one synthetic application programming interface call by the application programming interface of the transaction server.

In one embodiment, the application programming interface monitoring agent comprises a container-based management pod.

According to the embodiments herein, an illustrative system herein may comprise: a transaction server; a server instrumentation agent configured on the transaction server; and an application programming interface monitoring agent; wherein: the server instrumentation agent is configured to send instrumented server performance data regarding the transaction server and an associated correlation token to the application programming interface monitoring agent; the application programming interface monitoring agent is configured to send, to the server instrumentation agent, a returned acknowledgment of the instrumented server performance data regarding the transaction server and the associated correlation token, the acknowledgement also having corresponding application programming interface monitored performance data regarding an application programming interface of the transaction server; the server instrumentation agent is further configured to return a synchronization acknowledgment to the application programming interface monitoring agent in response to the returned acknowledgment to indicate complete synchronization; and one or both of the server instrumentation agent or the application programming interface monitoring agent are configured to correlate the instrumented server performance data regarding the transaction server and the application programming interface monitored performance data regarding the application programming interface of the transaction server based on the associated correlation token and complete synchronization.

According to the embodiments herein, an illustrative tangible, non-transitory, computer-readable medium herein may have computer-executable instructions stored thereon that, when executed by a processor on a computer, may cause the computer to perform a method comprising either of the methods listed above.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to perform either of the methods described above.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable subcombination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    sending, from a server instrumentation agent configured on a transaction server and to an application programming interface monitoring agent, instrumented server performance data regarding the transaction server and an associated correlation token, wherein the associated correlation token corresponds to occurrence of an online business transaction monitored by an application performance monitoring platform that is in communication with the server instrumentation agent;
    receiving, at the server instrumentation agent and from the application programming interface monitoring agent, a returned acknowledgment of the instrumented server performance data regarding the transaction server and the associated correlation token, the returned acknowledgement having corresponding application programming interface monitored performance data regarding an application programming interface of the transaction server associated with the online business transaction;
    returning, from the server instrumentation agent and to the application programming interface monitoring agent, a synchronization acknowledgment in response to the returned acknowledgment to indicate complete synchronization for monitored performance of the occurrence of the online business transaction; and
    correlating, by the server instrumentation agent and based on the complete synchronization, the instrumented server performance data regarding the transaction server and the application programming interface monitored performance data regarding the application programming interface of the transaction server by using the associated correlation token.

2. The method as in claim 1, wherein correlating occurs in response to a trigger.

3. The method as in claim 2, wherein the trigger is selected from a group consisting of: a failure; an anomaly; a visualization request; and an audit.

4. The method as in claim 1, wherein the application programming interface monitored performance data regarding the application programming interface of the transaction server is associated with a baseline of performance.

5. The method as in claim 1, further comprising:
    determining a plurality of online business transactions affected by correlated application programming interface monitored performance data regarding the application programming interface of the transaction server.

6. The method as in claim 1, wherein the server instrumentation agent comprises an application performance measurement java agent.

7. The method as in claim 1, further comprising:
    determining a plurality of online business transactions affected by correlated application programming interface monitored performance data regarding the application programming interface of the transaction server.

8. A method, comprising:
    receiving, at an application programming interface monitoring agent and from a server instrumentation agent configured on a transaction server, instrumented server performance data regarding the transaction server and an associated correlation token, wherein the associated correlation token corresponds to occurrence of an online business transaction monitored by an application performance monitoring platform that is in communication with the server instrumentation agent;
    sending, from the application programming interface monitoring agent and to the server instrumentation agent, a returned acknowledgment of the instrumented server performance data regarding the transaction server and the associated correlation token, the returned acknowledgement having corresponding application programming interface monitored performance data regarding an application programming interface of the transaction server associated with the online business transaction;
    receiving, at the application programming interface monitoring agent and from the server instrumentation agent, a synchronization acknowledgment in response to the returned acknowledgment to indicate complete synchronization for monitored performance of the occurrence of the online business transaction; and
    correlating, by the application programming interface monitoring agent and based on the complete synchronization, the instrumented server performance data regarding the transaction server and the application programming interface monitored performance data regarding the application programming interface of the transaction server by using the associated correlation token.

9. The method as in claim 8, wherein correlating occurs in response to a trigger.

10. The method as in claim 9, wherein the trigger is selected from a group consisting of: a failure; an anomaly; a visualization request; and an audit.

11. The method as in claim 8, wherein the application programming interface monitored performance data regarding the application programming interface of the transaction server is associated with a baseline of performance.

12. The method as in claim 8, further comprising:
    sending, from the application programming interface monitoring agent, at least one synthetic application programming interface call to the application programming interface of the transaction server; and
    computing, by the application programming interface monitoring agent; the application programming interface monitored performance data regarding the application programming interface of the transaction server based on responsiveness to the at least one synthetic application programming interface call by the application programming interface of the transaction server.

13. The method as in claim 8, wherein the application programming interface monitoring agent comprises a container-based management pod.

14. A system, comprising:

a transaction server;

a server instrumentation agent configured on the transaction server; and an application programming interface monitoring agent, wherein:

the server instrumentation agent is configured to send, to the application programming interface monitoring agent, instrumented server performance data regarding the transaction server and an associated correlation token, wherein the associated correlation token corresponds to occurrence of an online business transaction monitored by an application performance monitoring platform that is in communication with the server instrumentation agent;

the application programming interface monitoring agent is configured to send, to the server instrumentation agent, a returned acknowledgment of the instrumented server performance data regarding the transaction server and the associated correlation token, the returned acknowledgement having corresponding application programming interface monitored performance data regarding an application programming interface of the transaction server associated with the online business transaction;

the server instrumentation agent is further configured to return, to the application programming interface monitoring agent, a synchronization acknowledgment in response to the returned acknowledgment to indicate complete synchronization for monitored performance of the occurrence of the online business transaction; and one or both of the server instrumentation agent or the application programming interface monitoring agent are configured to correlate, based on the complete synchronization, the instrumented server performance data regarding the transaction server and the application programming interface monitored performance data regarding the application programming interface of the transaction server by using the associated correlation token.

15. The system as in claim 14, wherein correlating occurs in response to a trigger.

16. The system as in claim 15, wherein the trigger is selected from a group consisting of: a failure; an anomaly; a visualization request; and an audit.

17. The system as in claim 14, wherein the application programming interface monitored performance data regarding the application programming interface of the transaction server is associated with a baseline of performance.

* * * * *